United States Patent
Keppeler

(10) Patent No.: US 9,429,053 B2
(45) Date of Patent: Aug. 30, 2016

(54) METHOD AND DEVICE FOR OPERATING AN INTERNAL COMBUSTION ENGINE COMPRISING AN EXHAUST GAS CLEANING UNIT

(71) Applicant: Daimler AG, Stuttgart (DE)

(72) Inventor: Berthold Keppeler, Owen (DE)

(73) Assignee: Daimler AG, Stuttgart (DE)

(*) Notice: Subject to any disclaimer, the term of this patent is extended or adjusted under 35 U.S.C. 154(b) by 0 days.

(21) Appl. No.: 14/363,500

(22) PCT Filed: Sep. 20, 2012

(86) PCT No.: PCT/EP2012/003938
§ 371 (c)(1),
(2) Date: Jun. 6, 2014

(87) PCT Pub. No.: WO2013/083210
PCT Pub. Date: Jun. 13, 2013

(65) Prior Publication Data
US 2014/0318105 A1    Oct. 30, 2014

(30) Foreign Application Priority Data

Dec. 7, 2011  (DE) .................. 10 2011 120 508

(51) Int. Cl.
*F01N 3/00* (2006.01)
*F01N 3/021* (2006.01)
(Continued)

(52) U.S. Cl.
CPC ............ *F01N 3/021* (2013.01); *F01N 9/002* (2013.01); *F01N 11/00* (2013.01); *F02B 37/127* (2013.01);
(Continued)

(58) Field of Classification Search
CPC ........ F01N 11/00; F01N 3/021; F01N 9/002; F02B 37/127; F02B 37/013; F02D 41/0255; F02D 41/029; F02D 2200/0812; F02D 41/064; F02D 41/068
USPC .................. 60/274, 286, 295, 311
See application file for complete search history.

(56) References Cited

U.S. PATENT DOCUMENTS

| 8,429,897 B2 | 4/2013 | Christner et al. |
| 8,460,625 B2 | 6/2013 | Takayanagi et al. |

(Continued)

FOREIGN PATENT DOCUMENTS

| DE | 10 2008 007 404 A1 | 12/2008 |
| DE | 10 2009 007 764 A1 | 8/2010 |

(Continued)

OTHER PUBLICATIONS

International Search Report dated Jan. 22, 2013 with English translation (seven (7) pages).

(Continued)

*Primary Examiner* — Thomas Denion
*Assistant Examiner* — Matthew T Largi
(74) *Attorney, Agent, or Firm* — Crowell & Moring LLP

(57) ABSTRACT

A method for operating an internal combustion engine having an exhaust emission control unit with at least one exhaust emission control component which acts catalytically and/or by filtration involves operating the internal combustion engine, during a cold start or warm-up of the internal combustion engine, using a cold start engine operating process with predefined values for predefined internal combustion engine operating variables. The cold start and/or the warm-up of the internal combustion engine is controlled or regulated as a function of soot loading of a particle filter of the exhaust emission control unit.

8 Claims, 1 Drawing Sheet

(51) Int. Cl.
  *F02D 41/02* (2006.01)
  *F01N 9/00* (2006.01)
  *F01N 11/00* (2006.01)
  *F02B 37/12* (2006.01)
  *F02D 41/06* (2006.01)
  *F02B 37/013* (2006.01)

(52) U.S. Cl.
  CPC ......... *F02D 41/029* (2013.01); *F02D 41/0255* (2013.01); *F02B 37/013* (2013.01); *F02D 41/064* (2013.01); *F02D 41/068* (2013.01); *F02D 2200/0812* (2013.01); *Y02T 10/144* (2013.01); *Y02T 10/26* (2013.01); *Y02T 10/47* (2013.01)

(56) References Cited

U.S. PATENT DOCUMENTS

| 8,464,522 | B2 | 6/2013 | Fujiwara et al. | |
|---|---|---|---|---|
| 2008/0307771 | A1 | 12/2008 | Barton et al. | |
| 2010/0229538 | A1* | 9/2010 | Bloms et al. | 60/295 |
| 2012/0004833 | A1 | 1/2012 | Koch et al. | |
| 2012/0102944 | A1* | 5/2012 | Fulton et al. | 60/598 |
| 2013/0283769 | A1* | 10/2013 | Watanabe et al. | 60/274 |

FOREIGN PATENT DOCUMENTS

| DE | 10 2009 021 114 A1 | 11/2010 | |
|---|---|---|---|
| DE | 10 2010 014 824 A1 | 10/2011 | |
| EP | 1 672 205 A1 | 6/2006 | |
| EP | 1672205 A1 * | 6/2006 | |
| JP | 2002242661 A * | 8/2002 | ............... F01N 3/02 |
| JP | 2009-127458 A | 6/2009 | |
| JP | 2009-185659 A | 8/2009 | |
| JP | 2011-163199 A | 8/2011 | |
| WO | WO 2007/033751 A1 | 3/2007 | |

OTHER PUBLICATIONS

German-language Written Opinion (PCT/ISA/237) dated Jan. 22, 2013 (six (6) pages).
Partial English Translation of Japanese Office Action from Japanese Patent Office (Two (2) pages), mailed Jun. 16, 2015.
Japanese Office Action issued in Japanese counterpart application No. 2014-545117 dated Mar. 8, 2016, with partial English translation (Six (6) pages).

* cited by examiner

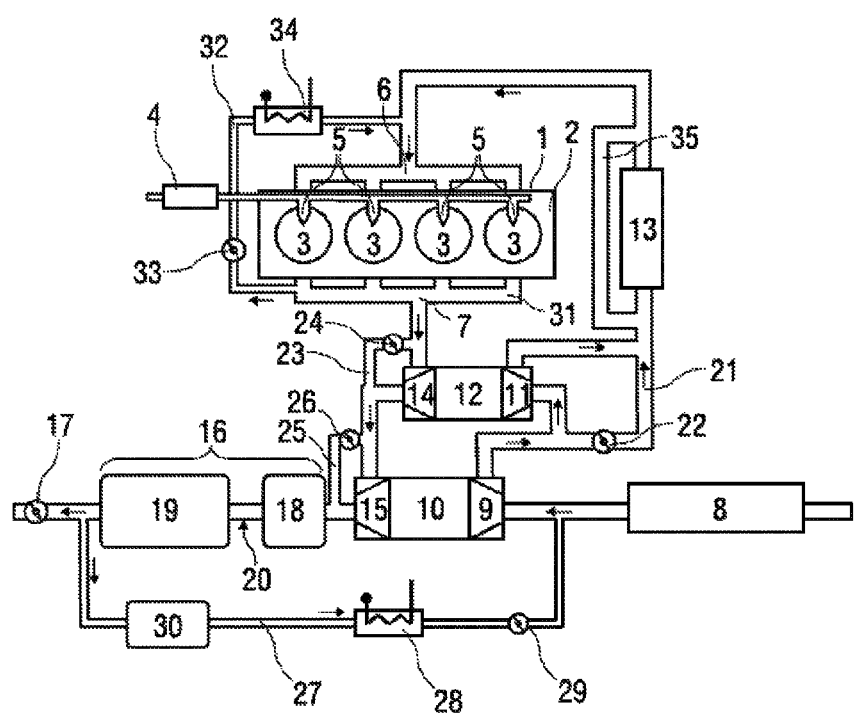

METHOD AND DEVICE FOR OPERATING AN INTERNAL COMBUSTION ENGINE COMPRISING AN EXHAUST GAS CLEANING UNIT

BACKGROUND AND SUMMARY OF THE INVENTION

Exemplary embodiments of the present invention relate to a method for operating an internal combustion engine having an exhaust emission control unit and to a device for operating an internal combustion engine having an exhaust emission control unit.

German patent document DE 10 2009 021 114 A1 describes a method for operating an air-compressing internal combustion engine, having an exhaust tract with an exhaust emission control unit that acts catalytically and/or by filtration. The combustion chambers of the internal combustion engine are supplied with fuel and a combustion gas, having an air fraction and a fraction of exhaust gas that is recirculated from the exhaust tract, which is provided for at least partial combustion of the fuel, the recirculated exhaust gas being suppliable to the combustion chambers with a low-pressure component via a low-pressure path that branches off from the exhaust tract downstream from the exhaust emission control unit, and with a high-pressure component via a high-pressure path that branches off from the exhaust tract upstream from an exhaust gas turbocharger turbine. An oxygen mass content in the combustion gas is at least approximately set to a predefinable setpoint value essentially by activating a low-pressure EGR valve situated in the low-pressure path and/or a sensor flap situated in the exhaust tract and a high-pressure EGR valve situated in the high-pressure path.

German patent document DE 10 2009 007 764 A1 describes a method for operating an internal combustion engine, having an exhaust emission control system with at least one exhaust emission control component which acts catalytically and/or by filtration. In conjunction with a cold start and/or a warm-up of the internal combustion engine, the internal combustion engine is operated using a cold start engine operating process with predefinable values for predefinable internal combustion engine operating variables. A quantity of HC stored in one or more of the at least one exhaust emission control component is estimated, and the cold start engine operating process is activated when the estimation shows that the quantity of stored HC exceeds a predefinable threshold value of the quantity of stored HC.

Exemplary embodiments of the present invention are directed to an improved method and device for operating an internal combustion engine having an exhaust emission control unit.

In the method of the invention for operating an internal combustion engine having an exhaust emission control unit which includes a particle filter in which, in conjunction with a cold start and/or a warm-up of the internal combustion engine, the internal combustion engine is operated using a cold start engine operating process with predefinable values for predefinable internal combustion engine operating variables. According to the invention the cold start and/or the warm-up of the internal combustion engine is/are controlled and/or regulated as a function of soot loading of a particle filter. As a result, controlled and particularly rapid temperature regulation of the exhaust emission control unit or at least of individual exhaust emission control components is made possible, resulting in particularly quick operational readiness of the exhaust emission control unit and particularly efficient exhaust emission control.

The temperature regulation of the exhaust emission control unit usually requires extreme temperature gradients in a heating phase directly after starting the internal combustion engine, in order to rapidly bring catalytically active components of the exhaust emission control unit, which are preferably present, into the temperature range in which they are active, and thus minimize the pollutant emissions. This increases the risk that soot stored in the particle filter may uncontrollably ignite. The resulting highly exothermic reactions may damage the particle filter or at least greatly intensify catalyst aging. This is reliably avoided with the present method. A cold start is understood to mean a start of the internal combustion engine under conditions in which the temperature of the coolant is below 50° C., in particular below 20° C., and/or a temperature within the exhaust emission control unit that is below 250° C., in particular below 200° C. Correspondingly, a warm-up is understood to mean an operation of the internal combustion engine subsequent to a cold start, in which the coolant and the exhaust emission control unit have not yet reached the mentioned temperatures. The warm-up operation is preferably ended directly after reaching the mentioned temperature values, and values of the operating variables intended for normal operation of the internal combustion engine are set.

The particle filter is particularly preferably heated to a predefinable operating temperature by controlled and/or regulated soot oxidation. During warm-up this optionally allows controlled removal of the soot stored in the particle filter, thus allowing a heating rate of the particle filter which is increased due to the released heat resulting from the soot oxidation, but which at the same time is controlled. The heating of the exhaust emission control unit may thus be advantageously assisted by controlled soot oxidation.

In a first embodiment, for an essentially unloaded particle filter, the exhaust emission control unit is heated to a predefinable operating temperature, using a predefinable maximum temperature gradient. This allows particularly rapid heating of the entire exhaust emission control unit, and thus a reduced warm-up time and resulting quick operational readiness and efficient exhaust emission control, in which ignition of the soot in the particle filter cannot occur. An "essentially unloaded particle filter" is understood to mean that the particle filter has a soot loading of less than 1 g per liter, in particular less than 0.5 g per liter, of particle filter volume. The maximum temperature gradient is suitably specified as a function of the highest possible value that is achievable under the prevailing conditions by setting appropriate values of internal combustion engine operating variables, and may have a value of approximately 100° C. to 500° C. per minute.

In a second embodiment, for a particle filter having soot loading exceeding a predefinable first threshold value, heating of the exhaust emission control unit during warm-up is carried out in such a way that a temperature in the particle filter is set below an ignition temperature of the stored soot. Uncontrolled ignition of the soot deposited in the particle filter is thus avoided during warm-up. The first threshold value for the soot loading corresponds to a comparatively high soot loading value of greater than approximately 5 g/L, in particular greater than 6 g/L. For these values of the soot loading, uncontrolled soot burnoff would release a very large quantity of heat within a short period of time, which due to limited heat dissipation would result in overheating of components of the exhaust emission control unit and in particular of the particle filter, which could damage or destroy the components or the particle filter. The warm-up is therefore carried out at a soot ignition temperature of approximately 550° C., so that the maximum temperature of the particle filter is below 550° C. during the warm-up operation.

In one preferred embodiment of the method, control and/or regulation of the internal combustion engine during warm-up is/are carried out in such a way that a lambda value of the combustion within the internal combustion engine is held below a predefinable value. The lambda value of the combustion is preferably held below approximately 1.2. The oxygen content in the exhaust gas may thus be held at a low value so that soot burnoff in the particle filter is prevented, or at least the rate of soot burnoff which could possibly take place unintentionally is limited to a noncritical value.

For a loaded particle filter, control and/or regulation of the internal combustion engine is/are particularly preferably carried out during warm-up in such a way that an exhaust gas mass flow is maximized. On the one hand this allows particularly rapid heating of components of the exhaust emission control unit, and on the other hand heat dissipation from the particle filter is increased, thus further reducing the risk of overheating due to soot burnoff.

Control and/or regulation of the internal combustion engine is/are advantageously carried out during warm-up in such a way that a start-stop operation of the internal combustion engine is deactivated. This reliably prevents switching off of the internal combustion engine during idling phases that occur during warm-up of the internal combustion engine, and thus prevents interruption of the operation of the internal combustion engine during the warm-up phase and resulting cooling down or cooling off of the exhaust emission control unit.

For a partially loaded particle filter having soot loading below a predefinable second threshold value, it is particularly preferred to carry out heating of the exhaust emission control unit to a predefinable operating temperature that is above an ignition temperature of the stored soot, using a predefinable maximum temperature gradient, resulting in ignition of the soot. Thus, during warm-up, soot is burned off in the particle filter, whose heat release further accelerates the heating of the exhaust emission control unit. This warm-up process is preferably carried out only when the soot loading of the particle filter is greater than zero but less than approximately 4 g/L, in particular less than 3 g/L, at the beginning of the warm-up. In the warm-up process under discussion, with a partially loaded particle filter, temperature regulation is preferably carried out based on a temperature measurement performed at the output side of the particle filter. In contrast, in warm-up variants in which no soot burnoff in the particle filter is possible or provided, temperature regulation of the heating is carried out based on a guide temperature measured upstream from the particle filter. In addition, for a warm-up in which soot burnoff in the particle filter takes place or is provided, a start-stop operation with switching off of the internal combustion engine during idling operating phases may be permitted.

In one particularly advantageous embodiment, in a warmed-up internal combustion engine a particle filter loaded with soot may be regenerated to a partially loaded state having a predefinable value of the soot loading. The plurality of all mandatory particle filter regenerations is preferably carried out in such a way that a residual loading of soot remains in the particle filter after completion of the regeneration. Thus, on the one hand the duration of regeneration of the particle filter during normal operation is shortened. On the other hand, burnoff of the remaining soot in the particle filter may be advantageously assisted during warm-up which takes place with a partially loaded filter after switching off the internal combustion engine.

By use of the method according to the invention, on the one hand fuel consumption of the internal combustion engine during the regeneration of the particle filter and during warm-up is reducible. On the other hand, catalyst aging during the regeneration of the particle filter is reduced due to the decreased thermal load.

Furthermore, by means of the method according to the invention, dilution of the lubricant that is circulated in the internal combustion engine, which occurs during the regeneration of the particle filter as the result of a conventional post-injection strategy, is reduced.

Emissions loading as well as pollutant emissions of the internal combustion engine are advantageously reducible.

Effectiveness of soot deposition in the particle filter may be increased in a particularly advantageous manner by means of the residual soot that remains in the particle filter. As a result, more porous particle filter substrates, which in particular allow so-called selective catalytic reduction, may be used.

In the device for operating an internal combustion engine having an exhaust emission control unit with at least one exhaust emission control component that acts catalytically and/or by filtration, in which in conjunction with a cold start and/or a warm-up of the internal combustion engine, the internal combustion engine is operable using a cold start engine operating process with predefinable values for predefinable internal combustion engine operating variables, according to the invention the cold start and/or the warm-up of the internal combustion engine is/are controllable and/or regulatable as a function of soot loading of a particle filter of the exhaust emission control unit, soot loading of the particle filter being determinable based on a differential pressure measurement of an exhaust gas back pressure upstream and downstream from the particle filter, and/or based on a computation model, stored in a control unit, of soot loading of the particle filter as a function of operating states of the internal combustion engine which occur.

BRIEF DESCRIPTION OF THE DRAWING FIGURE

Exemplary embodiments of the invention are explained in greater detail below with reference to one drawing, which shows the following:

FIG. 1 schematically shows an internal combustion engine, having supercharging and exhaust gas recirculation, which is suitable for carrying out the method according to the invention.

DETAILED DESCRIPTION

FIG. 1 schematically shows an internal combustion engine 1, having supercharging and exhaust gas recirculation, which is suitable for carrying out the method according to the invention. The internal combustion engine 1 is preferably designed as a conventional air-compressing internal combustion engine having two-stage supercharging and two-stage exhaust gas recirculation.

The internal combustion engine 1 includes an engine block 2 having working cylinders 3 with combustion chambers, not identified in greater detail, the working cylinders 3 or their respective combustion chambers being suppliable with fuel by means of a high-pressure pump 4 and corresponding injection nozzles 5.

A fresh air system 6 supplies the working cylinders 3 or their respective combustion chambers with fresh air as combustion air, and an exhaust tract 7 discharges exhaust gas from the working cylinders 3. Viewed in the flow direction of the fresh air, an air filter 8, a first compressor 9 of a low-pressure exhaust gas turbocharger 10, a second compressor 11 of a high-pressure exhaust gas turbocharger 12, and at least one charge air cooler 13 are situated in the fresh air system 6.

Starting from the engine block 2 in the flow direction of the exhaust gas, a first turbine 14 of the high-pressure exhaust gas turbocharger 12, a second turbine 15 of the low-pressure exhaust gas turbocharger 10, an exhaust emission control unit 16, and a downstream exhaust gas sensor flap 17 are situated in the exhaust tract 7.

The exhaust emission control unit 16 preferably includes at least one oxidation catalytic converter 18 and a particle filter 19, between which a metering valve 20 for an aqueous urea solution opens into the exhaust tract 7. The particle filter 19 may have a sintered metal design, or may be a wallflow filter unit having a honeycomb design or may be designed as a nitrogen oxides storage catalytic converter, or may also have a design that is a combination of both. In addition, the exhaust emission control unit 16 may include may one or more further exhaust aftertreatment units effective in cleaning, for example an SCR catalytic converter and/or a nitrogen oxides storage catalytic converter.

These types of exhaust emission control units are known to those skilled in the art, and therefore are not discussed in greater detail here. Without limiting universality, it is assumed below that the exhaust emission control unit 16 includes a particle filter 19 with an upstream oxidation catalytic converter 18 and a metering valve 20 for an aqueous urea solution.

A compressor bypass line 21 which bypasses the high-pressure exhaust gas turbocharger 12 branches off upstream from the second compressor 11; a compressor bypass valve 22 is situated in the compressor bypass line, so that fresh air or a fresh air-exhaust gas mixture which is compressed by means of the first compressor 9 may pass through the second compressor 11, and thus be further compressed, as a function of an operating state of the internal combustion engine 1 and a resulting position of the compressor bypass valve 22, for example with the compressor bypass valve 22 completely closed; or, with the compressor bypass valve 22 completely open, the fresh air or a fresh air-exhaust gas mixture flows around the second compressor 11 via the compressor bypass line 21; or, with the compressor bypass valve 22 partially open, a portion of the fresh air-exhaust gas mixture is compressible. In this manner a charge pressure of the internal combustion engine 1 may be regulated, or at low speeds of the internal combustion engine 1 in which the high-pressure exhaust gas turbocharger 12 is not yet operable due to insufficient exhaust gas pressure, the second compressor 11 may be bypassed via the compressor bypass line 21.

Situated in the exhaust tract 7 is a first turbine bypass line 23 in which a first turbine bypass valve 24 that bypasses the first turbine 14 is situated. Also situated in the exhaust tract 7 is a second turbine bypass line 25 in which a second turbine bypass valve 26 that bypasses the second turbine 15 is situated.

At low speeds of the internal combustion engine 1, and consequently a low exhaust gas pressure, the high-pressure exhaust gas turbocharger 12 is not yet operable. Therefore, in this operating state the first turbine bypass valve 24 is controllable in such a way that an exhaust gas mass flow may be led past the first turbine 14 via the first turbine bypass line 23, and thus utilized completely for driving the second turbine 15 of the low-pressure exhaust gas turbocharger 10.

At very high speeds of the internal combustion engine 1, the exhaust gas pressure acting on the turbines 14, 15 of the exhaust gas turbochargers 10, 12, respectively, is very high, which causes the turbines to reach very high speeds. This results in a very high compression power of the compressors 9, 11 of the exhaust gas turbochargers 10, 12, respectively, and thus a very high charge pressure of the fresh air-exhaust gas mixture. However, this charge pressure must not exceed a predefinable value, so that when this predefinable value is reached, one or both turbine bypass lines 23, 25 are activatable and usable as a so-called wastegate. The turbine bypass valves 24, 26 are controllable in such a way that they partially open, for example, as the result of which a portion of the exhaust gas mass flow may be led past the turbines 14, 15, and therefore the exhaust gas pressure which acts on and drives the turbines 14, 15 is reducible. This results in less compression of the gas which is compressed by the compressors 9, 11 of the exhaust gas turbochargers 10, 12, respectively, resulting in a lower charge pressure.

Due to this configuration of the low-pressure exhaust gas turbocharger 10 and the high-pressure exhaust gas turbocharger 12, the power of the internal combustion engine 1 may be optimized in different speed ranges, and a charge pressure that is optimal in each case may be provided. In particular so-called turbo lag, i.e., very low or no charge pressure and consequently low power of this type of internal combustion engine 1 at low speed ranges, may be prevented, or this problem may at least be greatly reduced, so that, for example, driving performance and fuel consumption of a vehicle that is driven by this internal combustion engine 1 may be optimized.

Downstream from the exhaust emission control unit 16, in particular on a low-pressure side of the exhaust tract 7, a low-pressure exhaust gas recirculation line 27 branches off from the exhaust tract 7 and once again opens into the fresh air system 6 upstream from the first compressor 9 of the low-pressure exhaust gas turbocharger 10 and downstream from the air filter 8. A low-pressure exhaust gas recirculation cooler 28 and a low-pressure exhaust gas recirculation valve 29 are situated in the low-pressure exhaust gas recirculation line 27, starting from the branch-off from the exhaust tract 7, viewed in the flow direction of a low-pressure exhaust gas recirculation mass flow. The cooling of the low-pressure exhaust gas recirculation mass flow may optionally take place with omission of the low-pressure exhaust gas recirculation cooler 28 by virtue of the pipe lengths or pipe configurations used. The cooling of the low-pressure exhaust gas recirculation mass flow ensures that impermissibly high temperatures do not occur at the compressors 9, 11 during the exhaust gas recirculation mode.

In addition, a so-called SCR catalytic converter 30 is situated in the low-pressure exhaust gas recirculation line 27, by means of which selective catalytic reduction of the low-pressure exhaust gas recirculation mass flow is made possible.

Upstream from the first turbine 14 of the high-pressure exhaust gas turbocharger 12, in particular on a high-pressure side of the exhaust tract 7, a high-pressure exhaust gas recirculation line 32 branches off from an exhaust manifold 31 of the exhaust tract 7, and upstream from the charge air cooler 13 opens into the fresh air system 6. A high-pressure exhaust gas recirculation mass flow may be led into the fresh air system 6 via a high-pressure exhaust gas recirculation valve 33 by means of this high-pressure exhaust gas recirculation line 32. In the illustrated embodiment, a high-pressure exhaust gas recirculation cooler 34, which optionally may be structurally and/or functionally combined with the low-pressure exhaust gas recirculation cooler 28, is situated in the high-pressure exhaust gas recirculation line 32. However, cooling of the high-pressure exhaust gas recirculation mass flow may also optionally take place, for example, by virtue of an appropriately designed pipe length of the high-pressure exhaust gas recirculation line 32.

The illustrated internal combustion engine 1 thus has exhaust gas recirculation in which exhaust gas upstream from the first turbine 14 of the high-pressure exhaust gas turbocharger 12 is removable from the exhaust tract 7 via a corresponding high-pressure path, and downstream from the exhaust emission control unit 16 is removable via a corresponding low-pressure path, and after cooling upstream from the first compressor 9 of the low-pressure exhaust gas turbocharger 10 and upstream from the charge air cooler 13, is suppliable to the fresh air system 6, and thus to the combustion chambers of the internal combustion engine 1. The internal combustion engine 1 is selectively operable without exhaust gas recirculation, with high-pressure exhaust gas recirculation or low-pressure exhaust gas recirculation, or simultaneously with high-pressure exhaust gas recirculation and low-pressure exhaust gas recirculation. The combustion chambers of the internal combustion engine 1 may thus be supplied with a combustion gas at an exhaust gas recirculation rate that is adjustable within a wide range. Setting of a quantity of recirculated exhaust gas, i.e., the recirculated exhaust gas mass flow and thus a so-called EGR rate, is carried out by means of the exhaust gas sensor flap 17 and/or the low-pressure exhaust gas recirculation valve 29 and by means of the high-pressure exhaust gas recirculation valve 33, so that the low-pressure component as well as the high-pressure component of the total recirculated exhaust gas are likewise settable within a wide range and independently of one another. This results overall in cleaner exhaust gas recirculation mass flow, better cooling of the exhaust gas recirculation mass flow, no sooting of the exhaust gas recirculation coolers 28, 34, and good intermixing of the exhaust gas recirculation mass flow with fresh air in the fresh air system 6. High exhaust gas recirculation rates are advantageously possible, and homogeneous or at least partially homogeneous operation of the internal combustion engine 1 is made possible.

In the present case, the exhaust gas sensor flap 17 and the low-pressure exhaust gas recirculation valve 29 are actuators of an exhaust gas recirculation control system which is designed as a pilot control system. The low-pressure exhaust gas recirculation valve 29, as well as the exhaust gas sensor flap 17, are preferably continuously adjustable. With the aid of the exhaust gas sensor flap 17 and the low-pressure exhaust gas recirculation valve 29 upstream from the first compressor 9, the low-pressure component is adjustable over the entire exhaust gas recirculation mass flow, which is thus likewise influenceable. As long as a sufficient pressure drop for conveying the low-pressure exhaust gas recirculation mass flow is present, the latter is initially adjustable solely via the low-pressure exhaust gas recirculation valve 29. If this is no longer the case, in addition the exhaust gas sensor flap 17 is adjustable in order to increase a pressure drop with respect to the low-pressure exhaust gas recirculation valve 29. Very good intermixing of the low-pressure exhaust gas recirculation mass flow with the fresh air is thus ensured. Another advantage, among others, is that exhaust gas recirculated via the low-pressure path is clean and practically pulsation-free. In addition, increased compressor power is available, since for a large low-pressure component of recirculated exhaust gas, a comparatively large exhaust gas mass flow may be led through the turbines 14, 15. Since the recirculated exhaust gas downstream from the compressors 9, 11 may be led through the charge air cooler 13, the temperature of the fresh air and of combustion gas which includes exhaust gas may be significantly lowered. The internal combustion engine 1 is operable, as needed, with the high-pressure exhaust gas recirculation and also with the low-pressure exhaust gas recirculation, or with both.

Sooting of the charge air cooler 13 is avoidable by means of a preferably provided charge air cooler bypass line 35 in the fresh air system 6 that bypasses the charge air cooler 13. The risk of so-called sooting occurs, for example, when a gas mixture in the charge air cooler 13 containing water vapor and optionally particles is cooled below the dew point, and corresponding condensate formation occurs or sets in.

It is preferably provided that the entire fresh air-exhaust gas mixture or also only a portion thereof may be led past the charge air cooler 13 via the charge air cooler bypass line 35, as a result of which the fresh air-exhaust gas mixture is not coolable by the charge air cooler 13, and therefore the temperature does not fall below the dew point. To ensure that the fresh air-exhaust gas mixture is still effectively coolable by means of the charge air cooler 13 when necessary, i.e., at high temperatures of the fresh air-exhaust gas mixture, a temperature sensor, not illustrated, is situated in the fresh air system 6 downstream from the compressors 9, 11 and upstream from the charge air cooler 13, so that when a predefinable temperature is reached, a charge air cooler bypass valve 36 situated in the charge air cooler bypass line 35 is appropriately controllable, whereupon this charge air cooler bypass valve 36 completely opens, for example, and opens up the charge air cooler bypass line 35 for the fresh air-exhaust gas mixture, or completely closes, or in another embodiment, partially opens.

For optimized operation of the internal combustion engine 1, additional sensors, not illustrated, are preferably provided in the exhaust tract 7 and in the fresh air system 6. In particular, temperature sensors and/or pressure sensors may be situated on the output side of the exhaust manifold 31, in the turbine bypass lines 23, 25, on the input side and/or on the output side or within the exhaust emission control unit 16, on the input side and/or on the output side of the air filter 8, on the input side and/or on the output side of the compressors 9, 11, in the exhaust gas recirculation lines 27, 32, and optionally at other locations in order to detect the temperature and pressure conditions in the fresh air system 6 and the exhaust tract 7. In addition, an air mass flow sensor is preferably provided downstream from the air filter 7 in order to detect the fresh air mass flow. Furthermore, exhaust gas sensors are preferably provided in the exhaust tract 7, such as a lambda sensor in the exhaust manifold 31 and upstream from and/or downstream from or within the exhaust emission control unit 16. The signals of the sensors that are present are processable by a control and regulation device, not illustrated, which may determine operating states of the internal combustion engine 1 in general, in particular in the exhaust tract 7 and in the fresh air system 6, based on the signals and stored characteristic curves and characteristic maps, and adjust the operating states by controlling actuators in a controlled and/or regulated manner. In particular, exhaust gas recirculation flow in the low- and high-pressure paths as well as a load state of the internal combustion engine 1 may be determined or set with respect to torque or average pressure, and speed.

In carrying out the method according to the invention, during a cold start and/or a warm-up of the internal combustion engine 1 the internal combustion engine 1 is operated using a cold start engine operating process with predefinable values for predefinable internal combustion engine operating variables. The cold start and/or the warm-up of the internal combustion engine 1 is/are controlled and/or regulated as a function of soot loading of the particle filter 19 of the exhaust emission control unit 16. Three operating states of the particle filter 19 are taken into account.

In a first, unloaded state of the particle filter 19, no soot is deposited or stored in the particle filter 19. In such an unloaded particle filter 19, the exhaust emission control unit 16 is heated to a predefinable operating temperature, using a predefinable maximum temperature gradient. This predefinable operating temperature may, for example, be above 550 degrees Celsius, and thus above an ignition temperature of the soot. This allows particularly rapid heating of the entire exhaust emission control unit 16 in which ignition of the soot in the particle filter 19 cannot occur, resulting in quick operational readiness of the exhaust emission control unit 16 and efficient exhaust emission control.

In the process, primarily exhaust emission control components that allow so-called selective catalytic reduction, for example the particle filter 19 and/or the SCR catalytic converter 30, are heated, so that they rapidly reach their operating temperature and thus result in minimal hydrocarbon, carbon monoxide, and nitrogen oxides emissions.

For an unloaded particle filter 19, control and/or regulation of the internal combustion engine 1 is/are advantageously carried out in such a way that a so-called start-stop operation of the internal combustion engine 1 is deactivated. Interruption of the operation of the internal combustion engine 1 in a warm-up phase, and resulting cooling down or cooling off of the exhaust emission control unit 16, are thus reliably avoided.

In a second, loaded state of the particle filter 19, the particle filter is completely or almost completely loaded with soot. Such a loaded state of the particle filter 19 is assumed, for example, at a particle density of greater than 4 grams per liter. In such a loaded particle filter 19, during a cold start or during a warm-up phase the exhaust emission control unit 16 is heated in such a way that a temperature in the particle filter 19 is set below an ignition temperature of the stored soot. Uncontrolled ignition of the particle filter 19 loaded with soot and a resulting uncontrolled exothermic reaction, which could damage or destroy the particle filter 19 and/or other exhaust emission control components of the exhaust emission control unit 16, are thus reliably avoided.

In addition, for a loaded particle filter 19, control and/or regulation of the internal combustion engine 1 is/are carried out in such a way that a lambda value of the combustion within the internal combustion engine is held below a predefinable value. For example, a lambda value of less than 1.2 may be set. Entry of oxygen into the exhaust tract is thus minimized, so that an oxygen supply for soot oxidation is advantageously reduced.

For a loaded particle filter 19, control and/or regulation of the internal combustion engine 1 is/are particularly preferably carried out in such a way that an exhaust gas mass flow is maximized, thus accelerating heating of the exhaust emission control unit 16.

For a loaded particle filter 19, control and/or regulation of the internal combustion engine 1 is/are advantageously carried out in such a way that a so-called start-stop operation of the internal combustion engine 1 is deactivated. Interruption of the operation of the internal combustion engine 1 in a warm-up phase, and resulting cooling down or cooling off of the exhaust emission control unit 16, are thus reliably avoided.

All of the above-mentioned and described measures may be carried out individually, or preferably together, during a cold start or during a warm-up phase of the internal combustion engine 1.

In a third, partially loaded state of the particle filter 19, the particle filter is partially loaded, or loaded in sections, with soot. Such a partially loaded state of the particle filter 19 is assumed, for example, at a particle density of less than 4 grams per liter, in particular less than 3 grams per liter. In such a partially loaded particle filter 19, the exhaust emission control unit 16 is particularly preferably heated to a predefinable operating temperature which is above an ignition temperature of the stored soot, using a predefinable maximum temperature gradient, so that ignition of the soot and resulting heating of the exhaust emission control unit 16 occur.

The particle filter 19 is thus heated to a predefinable operating temperature by means of controlled and/or regulated soot oxidation. This allows controlled removal of the soot stored in the particle filter 19, and at the same time allows controlled heating of the particle filter 19 and/or of the exhaust emission control unit 16. The heating characteristic of the exhaust emission control unit 16 may thus be advantageously assisted and accelerated by controlled soot oxidation.

In one particularly advantageous embodiment, a loaded particle filter 19 is not completely regenerated to an unloaded state during operation of the internal combustion engine 1, but instead is regenerated to a partially loaded state with a predefinable value of the soot loading. Effectiveness of soot deposition in the particle filter 19 may thus be increased by means of the residual soot that remains in the particle filter 19. As a result, more porous particle filter substrates which in particular allow so-called selective catalytic reduction may be used.

A conventional start-stop operation of the internal combustion engine 1 may be carried out in a particularly advantageous manner, since the soot oxidation during the cooling down or cooling off of the exhaust emission control unit 16, which usually occurs when the operation of the internal combustion engine 1 is interrupted, is counteracted.

Due to the described additional soot oxidation during the cold start or during a warm-up phase of the internal combustion engine, the customary regeneration intervals of the particle filter 19 advantageously do not have to be changed.

Soot loading of the particle filter 19 may be determined in a customary manner based on a differential pressure measurement of an exhaust gas back pressure upstream and downstream from the particle filter 19.

Since the differential pressure varies as a function of the engine speed, the load state of the internal combustion engine 1, and the loading of the particle filter 19, these parameters are preferably recorded in a characteristic map. The monitoring of the differential pressure and the initiation and control and/or regulation of the regeneration of the particle filter 19 are carried out by means of a control unit, not illustrated, of the internal combustion engine 1.

In addition, a computation model of soot loading of the particle filter 19 as a function of operating states of the internal combustion engine that occur is stored in the control unit in order to determine a loading state of the particle filter 19 during a cold start.

The parameters of the computation model and of the differential pressure measurement are preferably compared to one another during operation of the internal combustion engine 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Internal combustion engine
2 Engine block
3 Working cylinder
4 High-pressure pump
5 Injection nozzle
6 Fresh air system
7 Exhaust tract
8 Air filter
9 First compressor
10 Low-pressure exhaust gas turbocharger
11 Second compressor
12 High-pressure exhaust gas turbocharger
13 Charge air cooler
14 First turbine
15 Second turbine
16 Exhaust emission control unit
17 Exhaust gas sensor flap
18 Oxidation catalytic converter
19 Particle filter
20 Metering valve
21 Compressor bypass line
22 Compressor bypass valve
23 First turbine bypass line
24 First turbine bypass valve
25 Second turbine bypass line
26 Second turbine bypass valve
27 Low-pressure exhaust gas recirculation line
28 Low-pressure exhaust gas recirculation cooler
29 Low-pressure exhaust gas recirculation valve
30 SCR catalytic converter
31 Exhaust manifold
32 High-pressure exhaust gas recirculation line
33 High-pressure exhaust gas recirculation valve
34 High-pressure exhaust gas recirculation cooler
35 Charge air cooler bypass line

The invention claimed is:

1. A method for operating an internal combustion engine having an exhaust emission control unit that includes a particle filter, the method comprising:
operating, during a cold start or a warm-up of the internal combustion engine, the internal combustion engine using a cold start engine operating process with predefined values for predefined internal combustion engine operating variables;
determining a soot loading of the particle filter; and
controlling or regulating the cold start or the warm-up of the internal combustion engine as a function of the soot loading of the particle filter, wherein:
in a first operating state when the particle filter is unloaded, the controlling or regulating involves heating the exhaust emission control unit to a predefined maximum temperature, using a predefined maximum temperature gradient,
in a second operating state when the particle filter has a soot loading exceeding a predefined first threshold value, the controlling or regulating involves heating the exhaust emission control unit in such a way that a temperature in the particle filter remains below an ignition temperature of soot stored in the particle filter, and
in a third operating state when the particle filter is partially loaded with a soot loading below a predefined second threshold value, the exhaust emission control unit is heated to a predefined operating temperature above an ignition temperature of the stored soot, using a predefined maximum temperature gradient, resulting in ignition of the soot.

2. The method of claim 1, wherein when the particle filter is unloaded the exhaust emission control unit is heated with a temperature gradient of 100° C. per minute to 500° C. per minute.

3. The method of claim 1, wherein the predefined first threshold value is greater than 5 grams per liter.

4. The method of claim 1, wherein the predefined second threshold value is less than 4 grams per liter.

5. The method of claim 1, wherein when the particle filter has a soot loading exceeding a predefined first threshold value and when the exhaust emission control unit the particle filter is heated, control or regulation of the internal combustion engine is performed in such a way that a lambda value of combustion within the internal combustion engine is held or set below a predefined value.

6. The method of claim 5, wherein the control or regulation of the internal combustion engine is performed to maximize an exhaust gas mass flow.

7. The method of claim 1, wherein a start-stop operation of the internal combustion engine is deactivated.

8. A device for operating an internal combustion engine having an exhaust emission control unit that includes a particle filter, the device comprising: an electronic engine control unit configured to:
operate, during a cold start or a warm-up of the internal combustion engine, the internal combustion engine using a cold start engine operating process with predefined values for predefined internal combustion engine operating variables;
determine a soot loading of the particle filter; and
control or regulating the cold start or the warm-up of the internal combustion engine as a function of the soot loading of the particle filter, wherein:
in a first operating state when the particle filter is unloaded, the controlling or regulating involves heating the exhaust emission control unit to a predefined maximum temperature, using a predefined maximum temperature gradient,
in a second operating state when the particle filter has a soot loading exceeding a predefined first threshold value, the controlling or regulating involves heating the exhaust emission control unit in such a way that a temperature in the particle filter remains below an ignition temperature of soot stored in the particle filter, and in a third operating state when the particle filter is partially loaded with a soot loading below a predefined second threshold value, the exhaust emission control unit is heated to a predefined operating temperature above an ignition temperature of the stored soot, using a predefined maximum temperature gradient, resulting in ignition of the soot.

* * * * *